(12) United States Patent
Milman et al.

(10) Patent No.: US 10,262,149 B2
(45) Date of Patent: *Apr. 16, 2019

(54) ROLE ACCESS TO INFORMATION ASSETS BASED ON RISK MODEL

(71) Applicant: INTERNATIONAL BUSINESS MACHINES CORPORATION, Armonk, NY (US)

(72) Inventors: Ivan M. Milman, Austin, TX (US); Martin Oberhofer, Bondorf (DE); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,064

(22) Filed: Jun. 16, 2017

(65) Prior Publication Data

US 2018/0365439 A1 Dec. 20, 2018

(51) Int. Cl.
*G06F 21/00* (2013.01)
*G06F 21/62* (2013.01)

(52) U.S. Cl.
CPC .................. *G06F 21/6209* (2013.01)

(58) Field of Classification Search
CPC .................................................. G06F 21/6209
USPC .......................................................... 726/27
See application file for complete search history.

(56) References Cited

U.S. PATENT DOCUMENTS

| | | | |
|---|---|---|---|
| 6,950,825 B2 * | 9/2005 | Chang | G06F 21/6218 |
| 7,890,530 B2 | 2/2011 | Bilger et al. | |
| 8,135,605 B2 | 3/2012 | Osborn et al. | |
| 8,516,597 B1 * | 8/2013 | Sharma | G06F 21/577 |
| | | | 705/38 |
| 8,566,956 B2 | 10/2013 | Slater | |
| 8,706,692 B1 | 4/2014 | Luthra et al. | |
| 8,887,260 B2 | 11/2014 | Marcotte | |
| 9,239,908 B1 | 1/2016 | Constantine | |
| 9,432,375 B2 | 8/2016 | Cheng et al. | |
| 9,807,094 B1 * | 10/2017 | Liu | H04L 63/10 |
| 2008/0288330 A1 | 11/2008 | Hildebrand et al. | |
| 2009/0024663 A1 | 1/2009 | McGovern | |
| 2009/0076865 A1 | 3/2009 | Rousselle et al. | |
| 2013/0227712 A1 | 8/2013 | Salem et al. | |

(Continued)

OTHER PUBLICATIONS

IBM: List of IBM Patents or Patent Applications Treated As Related (Appendix P), Dec. 18, 2017, pp. 1-2.

(Continued)

*Primary Examiner* — Longbit Chai
(74) *Attorney, Agent, or Firm* — Jordan T. Schiller

(57) ABSTRACT

The program controls access to data objects stored on a tangible device of a computer system within an enterprise. A user request to access a data object identifies a user role by looking up the user identification in an enterprise directory. The program determines whether the role of the user is permitted access to a system and also determines a risk score representing a risk of dissemination of the requested data object. The program compares the risk score of the requested data object to a pre-configured threshold value of the requested data object and controls access to the requested data object, based on the role of the user, and the risk score associated with the risk of disseminating the requested data object.

19 Claims, 9 Drawing Sheets

| System | Role - Employee | Role - Shared | Role - Sales | Role - Svp |
|---|---|---|---|---|
| HR | Y | Y | Y | Y |
| Travel | Y | Y | Y | Y |
| General Ledger | N | Y | N | Y |
| Sales | N | N | Y | Y |

(56) References Cited

U.S. PATENT DOCUMENTS

2014/0304199 A1* 10/2014 Chari .................. G06N 5/02
706/12
2015/0205954 A1   7/2015 Jou et al.

OTHER PUBLICATIONS

Milman et al., Pending U.S. Appl. No. 15/844,660, filed Dec. 18, 2017, titled "Role Access to Information Assets Based on Risk Model," pp. 1-51.

Dos Santos et al., "A Framework and Risk Assessment Approaches for Risk-based Access Control in the Cloud," Preprint submitted to Journal of Network Computer Applications (74), Jul. 11, 2016, pp. 1-28.

Bijon et al., "A Framework for Risk-Aware Role Based Access Control," 6th Symposium on Security Analytics and Automation, 2013 (Best date available), Copyright IEEE 2013, pp. 462-469.

Mell et al., "The NIST Definition of Cloud Computing," National Institute of Standards and Technology, U.S. Department of Commerce, Special Publication 800-145, Sep. 2011, pp. 1-7.

\* cited by examiner

ROLE ACCESS TO INFORMATION ASSETS BASED ON RISK MODEL

BACKGROUND

The present disclosure relates generally to information access control, and more particularly to controlling user access to a data object on one or more computer systems.

The risk of valuable information falling into the wrong hands increases with the sensitivity, or confidential nature, of the information. Many information assets within an enterprise are protected by security mechanisms that apply basic authentication of a user on a system level, which in turn provides authorization to access encrypted, or masked, information assets within that system.

BRIEF SUMMARY

Embodiments of the present invention disclose a method, a computer program product, and a system.

According to an embodiment, a method of controlling access to a data object stored on a tangible device of a computer system receives a user request to access a data object and identifies a role of the user. The method determines a risk score representing a risk of dissemination of the data object, wherein the risk score is based in part on a dimension value of the data object. The method controls access to the data object, based on the role of the user, and the risk score associated with the risk of dissemination of the data object.

According to another embodiment, a computer program product for controlling access to a data object stored on a tangible device of a computer system. The storage device embodies program code that is executable by a processor of a computer to perform a method. The method receives a user request to access a data object and identifies a role of the user. The method determines a risk score representing a risk of dissemination of the data object, wherein the risk score is based in part on a dimension value of the data object. The method controls access to the data object, based on the role of the user, and the risk score associated with the risk of dissemination of the data object.

According to another embodiment, a system for controlling access to a data object, includes one or more computer devices each having one or more processors and one or more tangible storage devices. The one or more storage devices embody a program. The program has a set of program instructions for execution by the one or more processors. The program instructions include instructions for receiving a user request to access a data object and for identifying a role of the user. The program instructions include instructions for determining a risk score representing a risk of dissemination of the data object, wherein the risk score is based in part on a dimension value of the data object. The program instructions include instructions for controlling access to the data object, based on the role of the user, and the risk score associated with the risk of dissemination of the data object.

BRIEF DESCRIPTION OF THE DRAWINGS

FIGS. 3A and 3B are portions of a data object governance catalogue defining role-based access permissions for accessing various dimensions of a data object and various systems within an enterprise computer system, in accordance with embodiments of the present invention.

DETAILED DESCRIPTION

Figure 1:
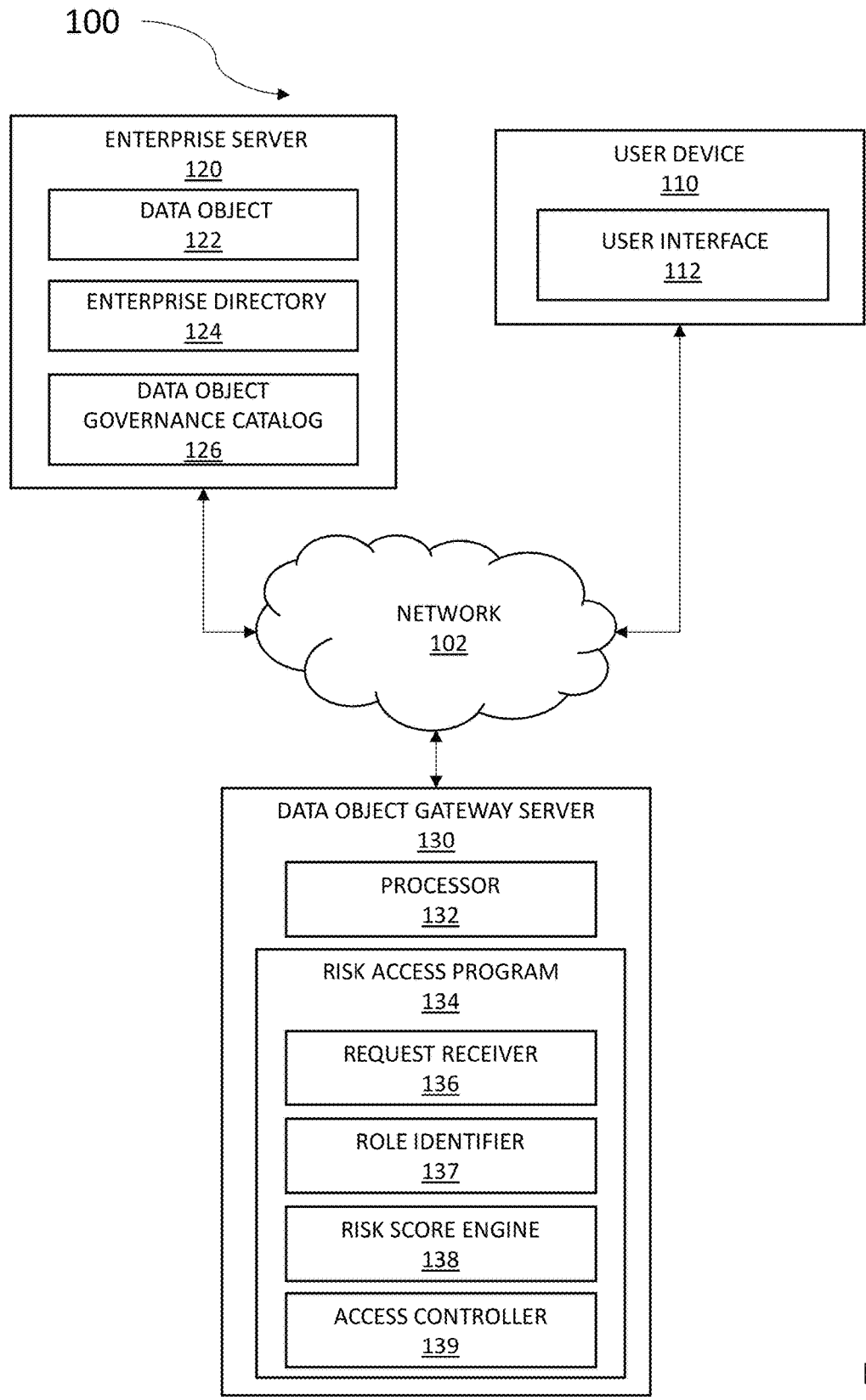
FIG. 1 illustrates a computing environment, in accordance with an embodiment of the present invention.

In an enterprise setting, employees typically have access to information assets based on the role of the employee. The current employee-based access model to information assets creates a lot of work for administrators to manually assign various levels of access to employees. As employee roles change, so may the employee's access to information assets. In many instances, a computer system within an enterprise sends e-mails to managers of various employees to approve or revoke a continued grant of access permissions to particular employees. This cumbersome task may overburden managers with many e-mails, in some cases hundreds of e-mails, depending on the size of the enterprise and the changes in roles and access needs.

Currently, what is not considered in administering this process is the value of the information asset and the associated risk of it getting into the wrong hands. Also, in the enterprise setting, the assessment of an information asset getting into the wrong hands may depend on the department, or business unit, that owns the information asset, and the department, or business unit, to which an accessing employee belongs. As employees move from one department to another throughout their career within an enterprise, the "need to know" factor and associated risk ratings, in relation to an information asset, for that employee change. For example, if an employee is promoted to a team leader or manager, a sensitivity risk associated with a particular information asset may be diminished because now the employee has a "need to know". Current security solutions to access information assets within an enterprise are not capable of measuring these sensitivity risks, and their associated access permissions, based on a combination of a user role and information asset risk factors.

Embodiments of the present invention disclose an information object risk security model that is role based. In the enterprise setting, this role may be an employee role. Embodiments of the invention may perform a runtime computation to compute a weighted risk score with a threshold for dynamic access or non-access decision from the program. Embodiments of the present invention may avoid the need to assign access privileges explicitly, wherever possible, to save administrators time to configure/remove access privileges to various employees; to save managers the burdensome task of confirming/declining system e-mails pertaining to access privileges for various employees within a system; and to provide access to information assets within an enterprise system, and to avoid information security risks, when employees move internally from one department to another.

It should be noted that embodiments of the invention are often discussed in relation to an enterprise setting to highlight their functions and advantages. However, embodiments of the invention are not limited to the enterprise setting, and may be used in any environment only as limited by the claims. An enterprise, generally, may refer to a hierarchical organization of a set of users. Relationships between the users within the enterprise may be representable using a data model such as a tree structure, where nodes represent users and edges between nodes represent hierarchical relationships between the users.

Hereinafter, exemplary embodiments of the present invention will be described in detail with reference to the attached drawings. The drawings used herein are for purposes of illustration, and may not show actual dimensions FIG. 1 is a functional block diagram of a computing environment 100, according to an embodiment of the present invention. Computing environment 100 includes user device 110, enterprise server 120, and data object gateway server 130, all connected via network 102. The setup in FIG. 1 represents an example embodiment configuration for the present invention.

In the example embodiment, user device 110 includes user interface 112. User interface 112 is a computer program which allows a user to interact with user device 110 and other connected devices via network 102. For example, user interface 112 may include a graphical user interface (GUI). In addition to being part of a computer program, user interface 112 may be connectively coupled to hardware components, such as those depicted in FIG. 4, for receiving user input and producing output. In the example embodiment, user interface 112 is a web browser, however in other embodiments user interface 112 may be a different program capable of receiving user interaction and communicating with other devices. According to an embodiment, user interface 112 may be an internal enterprise browser which permits a user, or employee, to exclusively interact with a company network and/or system.

In various embodiments, user device 110 may be a laptop computer, tablet computer, netbook computer, personal computer (PC), a desktop computer, a personal digital assistant (PDA), a smart phone, or any programmable electronic device capable of communicating with enterprise server 120 and data object gateway server 130 via network 102. User device 110 may include internal and external hardware components, as depicted and described in further detail below with reference to FIG. 4. In other embodiments, user device 110 may be implemented in a cloud computing environment, as described in relation to FIGS. 5 and 6, herein. User device 110 may also have wireless connectivity capabilities allowing it to communicate with enterprise server 120, data object gateway server 130, and other computers or servers over network 102.

In the example embodiment, enterprise server 120 comprises data object 122, enterprise directory 124, and data object governance catalog 126 and may be a laptop computer, tablet computer, netbook computer, personal computer (PC), a desktop computer, a personal digital assistant (PDA), a smart phone, or any programmable electronic device capable of communicating with server 130 and user device 110 via network 102. While enterprise server 120 is shown as a single device, in other embodiments, enterprise server 120 may be comprised of a cluster or plurality of computing devices, working together or working separately.

In the example embodiment, a data object 122 refers to an information asset. An information asset may refer to a collection of electronically stored information. Non-limiting examples of electronically stored information are electronic documents such as spreadsheet files, word processing files, presentation files, Portable Document Format (PDF) files; and images, audio, and video files. In an enterprise setting, these various electronic documents may contain information such as business plans, medical records, quarterly results, sales data, or any other information pertaining to an enterprise.

In the example embodiment, data object 122 may contain various dimensions. Dimensions may refer to categories, classifications, or groupings of information within data object 122. Dimensions may also refer to properties of data object 122, including metadata, such as when it was last modified or accessed. The same dimensions may exist across multiple data objects 122. Dimensions may be defined differently, according to embodiments of the invention, based on the specific nature of the data object 122 that they appear in. For example, in a spreadsheet file, the corresponding dimensions may be columns, rows, tabs, or other sections of the spreadsheet file. In a word processing document, dimensions may be section headers. In a presentation document, dimensions may be individual slides or group of slides. Dimensions may also be defined by a user. For example, a user may delineate sections of a document. A consideration in delineating the data in the document by section may be that the delineated information has varying levels of desired confidentiality.

In various embodiments, some dimensions in the same data object 122 may be more sensitive than others. For example, a given data object 122 may be a spreadsheet file containing employee data, including a list of employees of the enterprise, together with the following corresponding column headers (each column may be a dimension) for each listed employee: name, home address, job role, date of birth, salary, email address, phone number, medical information, promotion candidate information. These dimensions may exist in other spreadsheets, such as other lists of employees. Employee names and email addresses may be less confidential than employee medical information or promotion information.

A data object 122 may be stored in a database on an enterprise server 120. Enterprise server 120 may be a set of multiple servers or information technology (IT) systems, and data object(s) 122 may be stored on one or more of such servers or IT systems. Dimensions of data object 122, stored on a particular server or IT system, may also appear within other data objects 122 stored on other servers or IT systems. For example, multiple employee lists may be stored across various data objects 122 and across various IT systems within an enterprise's IT infrastructure. In each such case, the list may include identical dimensions, different dimensions, or overlapping dimensions. For example, all lists might include "first name", "last name", and "serial number", some lists may include salary information, and only one list may include promotion information.

A data object 122 may have various levels of sensitivity. The sensitivity may be, in part, a function of the sensitivity of the individual dimensions that form data object 122. As such, a data object 122 may contain associated access restrictions depending on the information that it contains. For example, an employee's salary and medical information may be configured by the enterprise to be more sensitive than the other listed dimensions contained within the spreadsheet of employee data, such as an employee's email address and job role. Where an employee's medical information is considered private, and ought to be kept out of the hands of certain groups of other employees or users outside the enterprise, perhaps due to strict legal regulations, access may be restricted to only authorized employees within the enterprise. In the same vein, an employee's email address and associated job role information within the enterprise may be accessible to all employees due to its relative non-private nature.

In the example embodiment, enterprise server 120 (there may be multiple such servers) is organized as a set of IT systems, each correlated with one or more functional areas of the enterprise. A functional area of the enterprise may correspond to a business unit, or division, within the enterprise. For example, an enterprise may have the following business units, or functional areas: human resources (HR), finance, real estate operations, legal, travel, general ledger, sales, and so forth. A data object 122 may be stored and organized on an enterprise server 120 based on the business unit, or functional area, that creates, owns, controls, or is associated with the data object. For instance, the example employee data spreadsheet may be stored on a database in the human resources system, an annual sales revenue spreadsheet may be stored on a database in the sales system, a business development power point presentation may be stored on a database in the business development system, and so forth.

In the example embodiment, an enterprise directory 124 may be stored in a database on enterprise server 120 and may contain hierarchical and organizational information about the enterprise and its employees, including employee roles. It may also include employee team information such as team types, team lists, team members, and team member roles. Enterprise directory 124 may also include basic information about employees within an enterprise, such as name, title, role(s), department (or system), and office location. In an example embodiment, a "role" is defined as a data type that indicates a user's relationship to other users in the enterprise hierarchy. A role may refer to an employee's (i.e. a user's) job title (e.g. manager, vice-president, senior vice-president, CEO) and to an employee's association with a particular department, or system, within the enterprise (e.g. finance, sales, human resources).

Figures 3A, 3B:
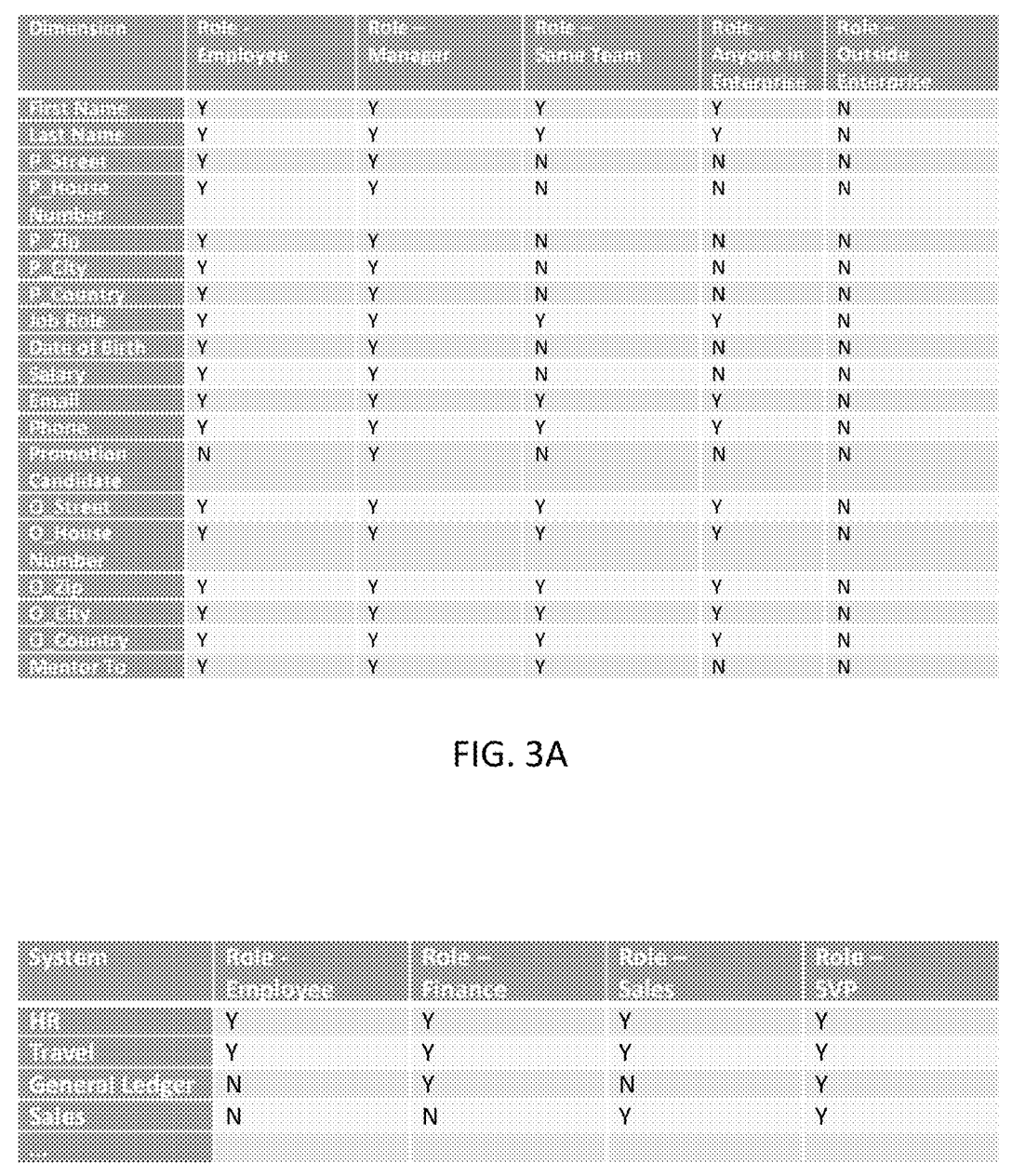

With continued reference to FIG. 1, data object governance catalog 126 may be a database (e.g. spreadsheet file) containing information that denotes which systems and which data dimensions, in the enterprise server 120, can be accessed by particular employee roles. As such, data object governance catalog 126 defines role-based access policies to IT systems, data objects, and dimensions of data objects. An example of portions of data object governance catalog 126 is provided in FIGS. 3A and 3B. FIG. 3A depicts a portion of data object governance catalog 126 defining role-based access permissions to data dimensions stored on enterprise server 120. FIG. 3B depicts a portion of data object governance catalog 126 defining role-based access permissions to systems in the enterprise's IT infrastructure, such as enterprise server 120. In the example embodiment depicted in FIGS. 3A and 3B, data object governance catalog 126 contains columns whose headers correspond to various defined roles of employees within an enterprise, and whose rows correspond to various dimensions of data object 122, such as first name, last name, job role, date of birth, and so forth. With reference to FIG. 3B, access permissions to various systems within an enterprise may be assigned to various employee roles. For example, if the requestor of a data object 122 is permitted access to the system containing the data object 122, then data object governance catalog 126 may cross-reference the data object 122 with the role of the requestor to identify the dimensions of the data object 122 that are accessible by the requestor, as pre-configured by a system administer in the enterprise.

With continued reference to FIGS. 3A and 3B, in the example embodiment, data object governance catalog 126 may denote, for a given pair of dimension and employee role (FIG. 3A), whether an employee having that employee role is permitted to access that dimension. This information may constitute a role-based governance policy for accessing that dimension, and may be denoted using a Boolean indicator, such as, "Y" or "N", meaning "YES" or "NO". Data object governance catalog 126 may further denote (FIG. 3B), for a given pair of a particular enterprise system and employee role, whether an employee having that employee role is permitted to access that system. This information may constitute a role-based governance policy for accessing that system, and may be denoted using a Boolean indicator, such as, "Y" or "N", meaning "YES" or "NO". These role-based governance policies may be used by various embodiments of the invention to control access to specific dimensions stored across systems in multiple data objects, without the need to manually manage access control, as employees change roles and move across business units.

With continued reference to FIG. 1, data object gateway server 130, in the example embodiment, may be a laptop computer, tablet computer, netbook computer, personal computer (PC), a desktop computer, a personal digital assistant (PDA), a smart phone, or any programmable electronic device capable of receiving and sending data to and from other computing devices. While data object gateway server 130 is shown as a single device, in other embodiments, it may be comprised of a cluster or plurality of computing devices, working together or working separately. In the example embodiment, data object gateway server 130 includes processor 132, and risk access program 134 which is stored on a storage device of data object gateway server 130. Risk access program 134 contains instruction sets which may be described using a set of functional modules. Processor 132 executes risk access program's 134 instruction sets.

In the example embodiment, risk access program 134 is a computer program that receives a user request for access to a data object 122, identifies the role of the user, determines whether the user is entitled to access the system containing the requested data object 122, and determines a risk score for the requested data object 122. Based on the risk score determination, risk access program 134 may allow access by the user to all or portions of data object 122, assign an access role to the user, or deny access to the user outright. In the example embodiment, data object gateway server 130 may contain an enterprise network access point, accessible via user device 110 over a secure website, requiring a username and password for authorized access. In another embodiment, data object gateway server 130 may contain an internal enterprise network access point, accessible directly on the network, by enterprise employees with a secure username and password. In another embodiment, risk access program 134 may be distributed as a standalone computer program that can be executed directly on user device 110.

With continued reference to FIG. 1, the functional modules of risk access program 134 include request receiver 136, role identifier 137, risk score engine 138, and access controller 139.

Request receiver 136 includes a set of programming instructions in risk access program 134. The set of programming instructions is executable by processor 132. Request receiver 136 receives a user request to access a data object. For example, a sales manager within an enterprise may want to evaluate candidates within the sales department for a promotion by reviewing the candidates' progress reports recorded by their team leader. To access the progress reports, the sales manager may enter her assigned username and password on data object gateway server 130, and selects a candidate's progress report file within a team leader's file folder. Request receiver 136 receives the request of the sales manager to access the file. In an embodiment, risk access program 134 may, as a preliminary consideration, determine whether the sales manager has an authorized role to access the system and the requested file.

Role identifier 137 includes a set of programming instructions, in risk access program 134, to identify a role of the user. The set of programming instructions is executable by processor 132. In the exemplary embodiment, role identifier 137 contains program instructions to identify a role of the user by querying enterprise directory 124 based on the entered user name. In alternative embodiments, role identifier 137 may contain program instructions to identify a role of the user by other identifying criteria, such as employee identification number, social security number, and so forth. For example, role identifier 137 may check whether the user is an "employee", "manager", "same team", "anyone in enterprise", "outside enterprise", as may be provided in enterprise directory 124. A user's role, as identified by role identifier 137, can be used by other components of risk access program 134, to regulate a user's access to various data objects 122 and enterprise systems.

In an embodiment, role identifier 137 identifies a user's role by verifying that the user is assigned one or more permitted roles on the enterprise system that store the data object 122, prior to granting access by the user to that system and that data object. Role identifier 137 may receive its verification of a user's role to access an enterprise system, by checking data object governance catalog 126 and by querying enterprise directory 124.

In another embodiment, if a user does not have a verified role to access an enterprise system, role identifier 137 may assign a role for the user that permits access to the enterprise system containing a requested data object 122, based on how the user compares to other users in an enterprise hierarchy. For example, the enterprise's employees may be organized in teams (team structures may be parallel to or independent from the enterprise's hierarchical organization). Team members may have various assigned roles. For example, a team member may be a "supervisor", a "team lead", a "liaison to another business group", a "full-time employee", and so on. Various team members may have shared roles. For example, more than one team member may be a "full-time employee", a "supervisor", and so on.

Where the user does not have a verified role, or role identifier 137 is otherwise used to assign a role for the user, role identifier 137 may compare the role of the user requesting access, the requestor, to the roles of other users in the enterprise hierarchy by: identifying one or more team members of the requestor having a role with access to the enterprise system; identifying a role shared by a minimum number of the one or more team members; and assigning to the requestor, the identified role shared by the minimum number of the one or more team members.

For example, a requestor may be a full-time saleswoman in the sales division within an enterprise. The saleswoman may not have access to the sales tracking sheet within the sales division for any number of reasons, one of which may be that she is new to the enterprise and the system administrator did not yet assign an access permission. Role identifier 137 identifies that three of the four saleswoman's team members have the same role (saleswoman) as the saleswoman, and have access to the sales tracking sheet. Given this information, role identifier 137 may assign the identified shared role of the saleswoman's team members to the saleswoman, thereby permitting access to the sales tracking sheet, prior to the system administrator getting around to manually assigning this access permission to the new saleswoman.

In another embodiment, role identifier 137 may assign to the user requesting access, i.e., the requestor, the identified role shared by the minimum number of the one or more team members, only if the enterprise hierarchy level of the requestor has a minimum required distance from an enterprise hierarchy level of a root user. A root user may refer to an employee level starting point, within the enterprise hierarchy structure, for determining a minimum required distance to the requestor level, within the hierarchy structure of the enterprise.

For example, an enterprise hierarchy may be viewed as a tree structure where a chief executive officer (CEO) is at the first level (root level or root node). Those reporting directly to the CEO may be part of another level connected to the CEO. In this example, the root user may be the CEO. In another example, the root node may be the general counsel; or a sales manager; and so forth.

In the embodiment where role identifier 137 assigns, to the requesting user, the same role shared by a minimum number of the user's team members only if the user has a minimum required distance from a root user; risk access program 134 erects invisible fences, so to speak, around a data object 122, or dimensions of a data object 122, that contain sensitive, or confidential information. This allows risk access program 134 to limit the impact of team structures in determining assigned roles, and ensures that an employee who is at a leaf-level node is not inadvertently assigned the same role as the root user merely because they are on the same team.

For example, user access to particular dimensions of a data object 122 may be limited to two hierarchy levels down from CEO. In this fashion, role identifier 137 prevents access to a data object 122, or dimensions of a data object 122, by those employees who are not within two hierarchy levels down from CEO.

With continued reference to the above example, even though the new saleswoman may have a shared role with a minimum required number of team members, access to the sales tracking sheet may further be dependent on whether the saleswoman is no more than three hierarchy levels down from the sales division president, or root user, in this scenario. Since the hierarchy organization, in this example, goes "sales division president"→"sales division vice-president"→"sales division manager"→"sales division supervisor"→"saleswoman", the saleswoman might not be assigned a role for access since she is more than three hierarchy levels down from the sales division president.

In another embodiment, role identifier 137 may assign to the user requesting access, the requestor, the identified role shared by the minimum number of the one or more team members, only if the enterprise hierarchy level of the requestor has a minimum required distance from an enterprise hierarchy level for the one or more team members. With continued reference to the above example, if the new saleswoman joined a team of senior vice-presidents to work on a collaboration project, the new saleswoman would be prevented from accessing data objects that are only accessible to senior vice-presidents, by making access further dependent on a requestor's role having a minimum required distance from an enterprise hierarchy level for one or more team members. In this scenario, the other team members are senior vice-presidents. Even though the new saleswoman now has an identified role shared by a minimum number of team members, the new saleswoman falls well below senior vice-president in the enterprise hierarchy structure, and therefore would not be assigned a role for access.

In another embodiment, role identifier 137 may deny the user access to the requested data object 122 by generating a message to the user denying requested access to the data object 122. In alternative embodiments, role identifier 137 may deny a user requested access to a data object 122 in any other way known to one of ordinary skill in the art.

Risk score engine 138 includes a set of programming instructions, in risk access program 134, to determine a risk score representing a risk of disseminating a data object 122, wherein the risk score is based in part on a dimension value of the data object 122. The set of programming instructions is executable by processor 132.

A risk of disseminating a data object 122 refers to a risk of a user accessing a data object 122 or its various dimensions, where the user should not have been granted access. For example, the wider the dissemination of a data object 122 to unauthorized users, the greater the likelihood of confidential information being misused or becoming public. In one embodiment, a risk of dissemination for a data object 122 or its dimensions may be measured relative to whether a manual determination would grant access to that data object or its dimensions. For example, if a system administrator were to decide whether an employee should be granted access to a data object, this decision would be indicative of a desire, or intention, to grant access to (i.e. disseminate) the information. The higher the divergence between the actual dissemination and the desired dissemination, the higher the risk of dissemination of a data object.

According to embodiments of the invention, determining, or estimating, a risk score for disseminating a data object 122 may be accomplished by assigning dimension values to various dimensions of data object 122. The dimension value may be a measure of how valuable that information is to the enterprise, or how sensitive it would be to inadvertently disclose that information to unauthorized users, or the public. The assigned dimension values for each dimension of a data object 122 may be configurable by a user such as a system administrator within the enterprise, and may be changed, as needed.

In an exemplary embodiment, dimensions of a data object may be assigned dimension values using a numerical scale of 0 to 1, where 0 denotes a low sensitivity, or confidentiality, of the information, and 1 denotes a high sensitivity, or confidentiality, of the information. In other embodiments, other scales may be used to denote dimension values. For example, dimensions of a data object 122 corresponding to a confidential spreadsheet that sets out an enterprise's business objectives (e.g. future direction, expected sales, etc.), may contain dimension values of 1, given the confidential nature of the information. Dimensions of a data object 122 with a value of 1 may be configured to allow access to only a few employees within the enterprise. In an alternative embodiment, dimensions of a data object 122 with a value of 0 may be configured to allow access to almost all employees within the enterprise.

According to a more particular example, dimensions and respective dimension values for a data object 122 may include: dimension value 1 ("d1")=1 (the enterprise is heading in a new direction). Dissemination of this information may affect competitor strategies. Therefore, the information may be deemed highly sensitive, and treated as a critical dimension. Dimension value 2 ("d2")=0.8 (employee medical information). This may be very sensitive dimension because regulations like HIPAA outline the legal ramifications if these records are lost to the public domain. Dimension value 3 ("d3")=0 (the cost of each product sold). This is public information and therefore available to be accessed by all employees within the enterprise. Dimension value 4 ("d4")=0.6 (the enterprise's research and development budget for the upcoming year). This information, if lost to the public domain, may affect an enterprise's competitive edge. Dimension value 5 ("d5")=0.7 (expansion of additional manufacturing facilities). This information may be crucial to maintaining a competitive edge and therefore is assigned a higher dimension value. Dimension value 6 ("d6")=0.3 (the age of the data and its last modification). The older the data, the more it may decrease in sensitivity and might not be an accurate reflection of its actual worth within the enterprise. As such, a lower dimension value may be assigned to this dimension. Dimension value 7 ("d7")=0.9 (the number of times employees within the enterprise have requested this information asset within the past 30 days). This information may dictate the level of importance of the asset, and therefore is assigned a higher dimension value.

According to an embodiment, a risk score is a calculated numerical value associated with a data object 122 that denotes how sensitive or confidential that data object 122 or its dimensions are. In the exemplary embodiment, a risk score for a data object 122 may be calculated by aggregating the one or more dimension values associated with the one or more dimensions of the data object 122.

In an embodiment of the present invention, risk score engine 138 may further determine a risk score representing a risk of disseminating a data object 122, by assigning one or more weight values to one or more numerical values associated with one or more dimensions of the data object 122. Weight values may be numerical values ranging from 0 to 1. For example, a 0 value may indicate low importance of a particular dimension, whereas a 1 value may indicate high importance of a particular dimension.

With continued reference to the more particular example above, risk score engine 138 multiplies the one or more weight values with the one or more numerical values associated with the one or more dimensions of the data object 122, to create one or more weight-dimension values corresponding to the one or more dimensions. For example, the dimension values (d1-d7) are multiplied by a corresponding weight value (w1-w7), to create weight-dimension values corresponding to the one or more dimensions as follows: d1(1)*w1(1)=1; d2(0.8)*w2(0.8)=0.64; d3(0)*w3(0.2)=0; d4(0.6)*w4(1)=0.6; d5(0.7)*w5(0.3)=0.21; d6(0.3)*w6(0.6)=0.18; d7(0.9)*w7(0.9)=0.81. The weight-dimension values are then aggregated to produce a risk score, as follows: 1+0.64+0+0.6+0.21+0.18+0.81=risk score (3.44) for requested data object 122.

Access controller 139 includes a set of programming instructions, in risk access program 134, to control access to a data object 122, based on the role of the user, and the risk score associated with the risk of disseminating the data object 122. The set of programming instructions is executable by processor 132.

Access controller 139 obtains the role of a user from role identifier 137. As described herein, an assigned role for a user is a factor in determining access permissions to particular systems and dimensions of data objects, in accordance with data object governance catalog 126. For example, referring now to FIGS. 3A and 3B, a user with the assigned role "employee" may have access to the human resources (HR) system, and to particular dimensions of a data object within the HR system (or on other systems), such as "first name", "last name", "date of birth", and "e-mail". Alternatively, with continued reference to FIGS. 3A and 3B, a user with the assigned role "employee" may have access to the HR system, however "employee" would not have access to all dimensions of a requested data object on the HR system (or on other systems), such as "promotion candidate" dimension. With continued reference to FIGS. 3A and 3B, "employee" may not have access to the sales system, and therefore "employee" would not have access to a data object on the sales system (or on other systems), in this example.

Implementation of access controller 139 using a role-based access model removes the need for various system administrators to grant or deny access permissions to various user requests. Instead, a user's access to a system or data object 122 stored on the system is inherent in the user's verified or assigned role.

In addition to identifying a user's role, access controller 139 also obtains the risk score associated with the risk of disseminating a data object 122 from risk score engine 138. According to an embodiment, the risk score of requested data object 122 may then be compared to a pre-configured threshold value to determine whether the user is granted access, denied access, or assigned a permitted user role for access, by access controller 139, to the requested data object 122.

A pre-configured threshold value sets a bar to determine whether a denoted risk score for a data object 122 meets the threshold for access to the data object 122. Threshold values are configurable by a user, such as a system administrator, within the enterprise to restrict access to dimensions of a data object 122. Access controller 139 may compare the denoted risk score of a data object 122 to a pre-configured threshold value associated with the data object 122. For example, referring to the more particular example above, risk score engine 138 aggregates the individual dimension values of the various dimensions of data object 122 (d1+d2+d3+d4+d5+d6+d7) to arrive at a risk score of 4.3. If the role of a user is permitted access to the system housing the requested data object 122, and the risk score for the data object 122 is less than the pre-configured threshold value of the requested data object 122, then access controller 139 may grant the user access to certain dimensions of the requested data object 122, in accordance with the applied filters of data object governance catalog 126.

In an embodiment, access to the data object 122 may be granted or denied based on the data object's 122 risk score, without being conditioned on the user's access permissions to the system that stores the data object 122.

If the risk score of a data object 122 is equal to or greater than a pre-configured threshold value, then access controller 139 may deny the user access to a requested data object 122, altogether. In an alternative embodiment, if the risk score of a data object 122 is equal to or greater than a pre-configured threshold value, then access controller 139 may grant limited access to particular users within the enterprise hierarchy.

With reference to an illustrative example, a team manager within an enterprise may be permitted access to a sales business unit system containing the quarterly sales results file (i.e. a data object 122) of a sales employee. If the risk score associated with the quarterly sales results file is 2.5 and the pre-configured threshold value to access the file is 5.0, then team manager may be permitted access to the entire file. Alternatively, access controller 139 additionally consults data object governance catalog 126 to filter the file and its dimensions, and provide access to a subset of the dimensions to which the team manager is permitted to have access based on her role. In the first instance, all aspects of the quarterly sales result file are accessible by the team manager, including total sales for the quarter, notes and comments of the sales employee's team leader, and so forth. In contrast, if a sales employee requests access to the quarterly sales results file, then access may be granted, however the sales employee may have access to certain dimensions of the file, such as total sales for the quarter, but may not have access to the notes and comments of the sales employee's team leader.

In alternative embodiments of the present invention, access controller 139 may be configured to allow access to a requested data object 122 based on user-assigned value ranges for the requested data object 122. For example, a manager may have complete access to the sales business unit system and all dimensions of a data object on the sales business unit system; a sales employee's team leader may have access to the sales business unit system and the dimensions of a data object on the sales business unit system with a risk score range of 0-4; and a sales employee may only have access to the sales business unit system and the dimensions of a data object on the sales business unit system with a risk score range of 0-2.

In an embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between user device 110, enterprise server 120, and data object gateway server 130.

FIGS. 2A-2G are flowcharts depicting operational steps of methods for controlling access to data objects on a computer system, according to an embodiment of the present invention. For example, these methods can be operational steps performed by one or more components of computing environment 100, such as processor 132 executing programming instructions of risk access program 134 (FIG. 1).

Figure 2A:
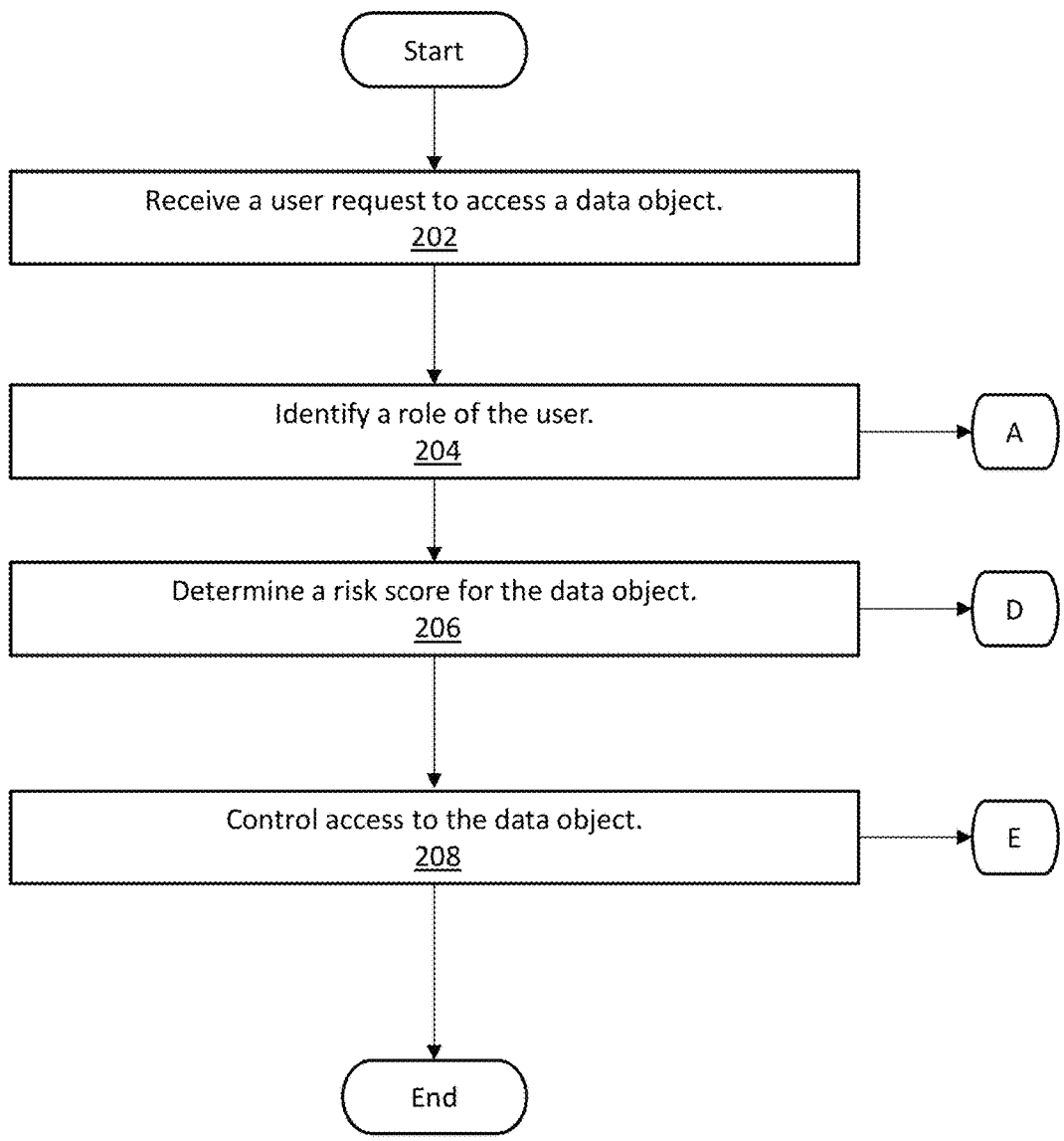
FIGS. 2A, 2B, 2C, 2D, 2E, 2F, and 2G are flowcharts illustrating the operation of risk access program of FIG. 1, in accordance with embodiments of the present invention.
Figure 2B:
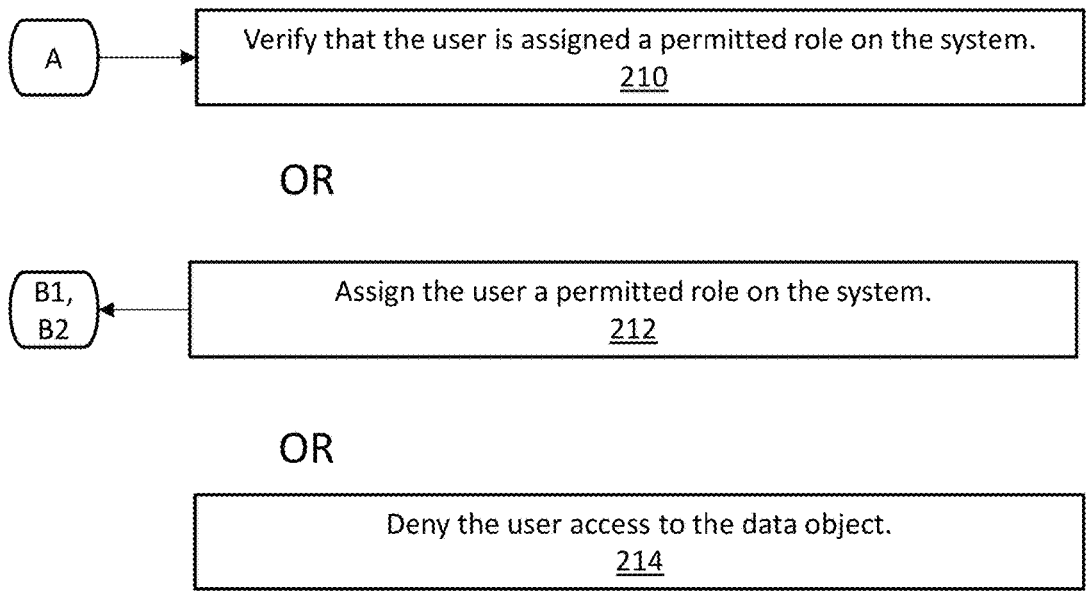
Figure 2C:
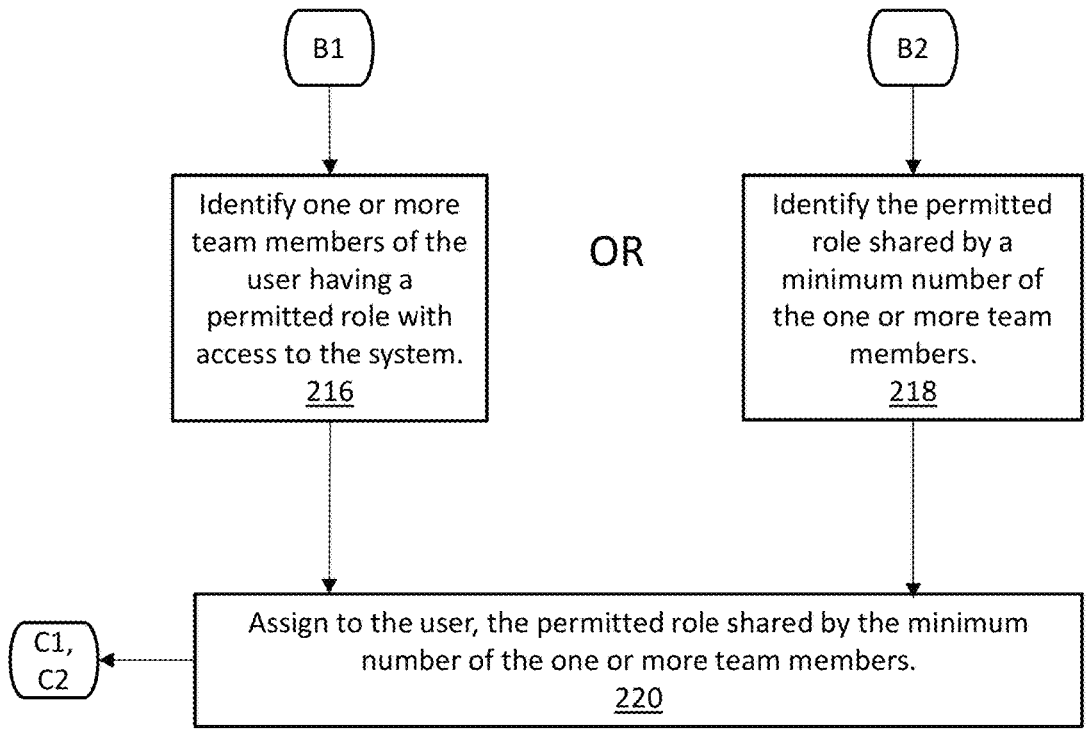
Figure 2D:
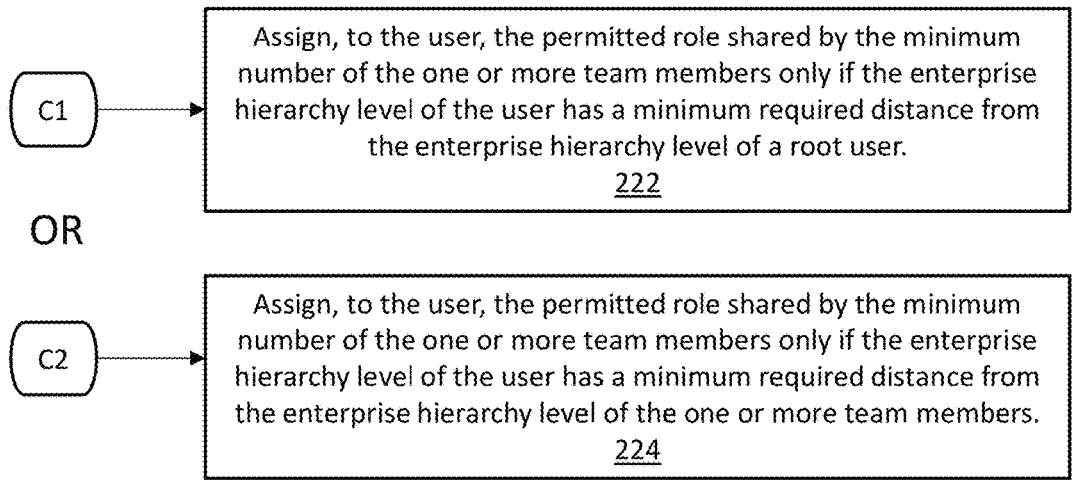
Figure 2E:
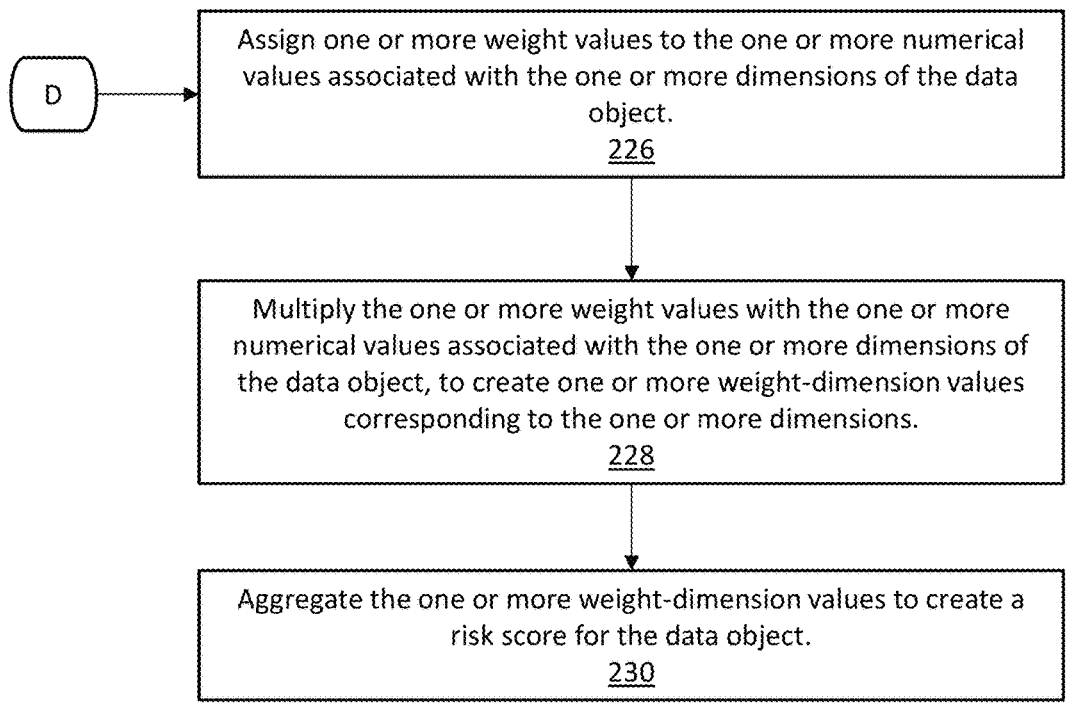
Figure 2F:
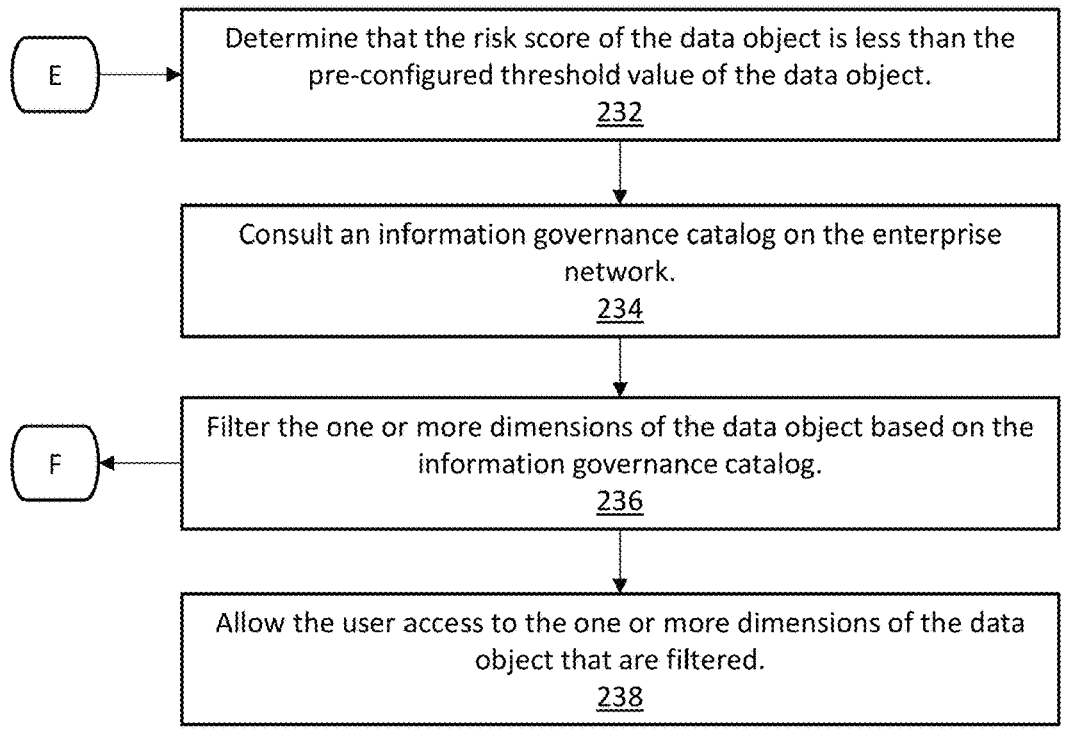
Figure 2G:
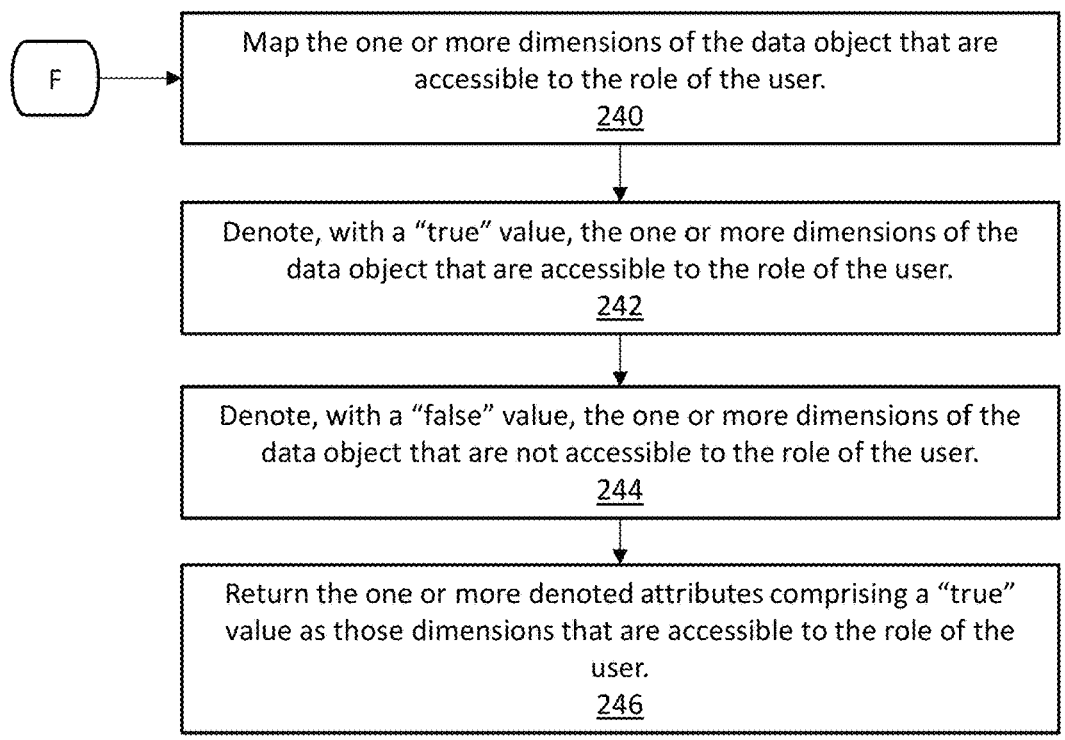

The method depicted in FIG. 2A generally operates to receive a user request to access data object 122. This method identifies a role for the user (some variants of which are depicted in FIGS. 2B, 2C, and 2D), and determines a risk score for data object 122 (a variant of which is depicted in FIG. 2E). This method controls access to data object 122 (or its dimensions) based on the user's identified role, and based on data object's 122 determined risk score (some variants of which are depicted in FIGS. 2F and 2G).

Referring now to FIGS. 1 and 2A, risk access program 134, via processor 132, receives, via request receiver 136, a user request to access a data object 122 (step 202). The user request may be received from user device 110, via user interface 112. The user may be required to log on to an enterprise network, before making the request, by entering a unique username and secure password. For example, data object 122 may include an electronic medical record (EMR)

stored on a computer system owned or controlled by a hospital. The EMR may be a file for patient data and may include medical history, basis for hospitalization, record of medications dispensed, and treatment plan for the patient. In the exemplary embodiment, a doctor within the hospital may request, using a computer terminal or a mobile device, access to the patient's EMR via request receiver 136.

With continued reference to FIGS. 1 and 2A, role identifier 137 of risk access program 134, identifies a role of the user (step 204). In the exemplary embodiment, role identifier 137 accesses enterprise directory 124 to determine the role of the user. For example, an enterprise directory for a hospital may include a list of doctors, administrators, and other hospital staff within the hospital, such as name, job title, roles and responsibilities, email address, and so forth. The hospital directory may be hierarchical. In the example of a doctor requesting a patient's EMR, role identifier 137 identifies the doctor's role in the hospital directory. Details of additional method steps for identifying a user's role are discussed below in connection with FIGS. 2B, 2C, and 2D.

With continued reference to FIGS. 1 and 2A, risk score engine 138 of risk access program 134, determines a risk score representing a risk of disseminating data object 122, where the risk score is based in part on a dimension value of the data object (step 206). In the exemplary embodiment, a patient's EMR contains various pieces of information such as medical history, prescribed medications, family medical history, treatment plan, attending doctor's notes and comments, nurse's notes and comments, and other confidential information. Some of the information within the EMR may only be useful for the attending doctor or the nurse (e.g. family history, prescribed drugs, etc.), and not the hospital administrator or receptionist. In a similar vein, some of the information available within the patient's EMR may only be useful to hospital administration and reception staff (e.g. insurance information) and not to the attending doctor or nurse. In both cases, the patient's EMR contains confidential information whose dissemination should be selective. Thus, in the exemplary embodiment, risk score engine 138 identifies dimension values of the various dimensions in the EMR, weighs them if needed, and calculates a corresponding risk score for the EMR by adding up the dimension values (or the weighted dimension values) of the EMR. Details of an additional method step for determining a risk score representing a risk of disseminating a data object 122 is discussed below in connection with FIG. 2E.

With continued reference to FIGS. 1 and 2A, access controller 139 of risk access program 134, controls access to data object 122, based on the identified role of the user, and the risk score associated with the risk of disseminating the data object 122 (step 208). With reference to the continued illustrative example above, risk access program 134 may determine that the risk score associated with the patient's EMR is less than the threshold value assigned to accessing the EMR by employees with certain assigned roles, such as the attending doctor or nurse. In the exemplary embodiment, data object governance catalog 126 denotes the permissible roles of employees (i.e. doctor, nurse, pharmacist, receptionist, medical biller, etc.), within the hospital who are able to access various dimensions of the patient's EMR, without the requirement of a supervisor to manually provide temporary passwords or to send an email to a system administrator for access. Details of additional method steps for controlling access to data object 122, based on the identified role of the user and the risk score associated with the risk of disseminating the data object 122, are discussed below in connection with FIGS. 2F and 2G.

Referring now to FIGS. 1, 2A, and 2B, and resuming the description of the functions of identifying a user's role; role identifier 137 of risk access program 134, can verify a user's role, assign a role to the user, or deny access by the user where no satisfactory role is identified.

In the case of verifying the user's role, role identifier 137 verifies that the user is assigned a permitted role on the enterprise system containing the data object (step 210). In the exemplary embodiment, if an emergency room nurse in a hospital attempts to access a patient's EMR, who is now getting x-rays in the radiology department, the hospital system verifies the identity of the nurse in enterprise directory 124. If the hospital network permits emergency room nurses to access patient EMRs across all systems within the hospital (e.g. emergency room, radiology, ICU, etc.), then the emergency room nurse's role is verified at this step.

With continued reference to FIGS. 1, 2A, 2B, role identifier 137 of risk access program 134 may assign the user a permitted role on the enterprise system containing data object 122 based on how the user compares to other users in an enterprise hierarchy (step 212). With continued reference to the illustrative hospital example above, a hospital receptionist may need to access a patient's medical insurance information within an EMR, however does not have an assigned role that permits access to the EMR. In this scenario, role identifier 137 may compare the role of the hospital receptionist to other users, or team members, in the hospital and assign a role to the hospital receptionist based on the comparison results. Details of the method step for comparing a user to other users in an enterprise hierarchy is discussed below in connection with FIG. 2C.

With continued reference to FIGS. 1 and 2B, role identifier 137 of risk access program 134 may deny the user access to the data object 122 (step 214). With continued reference to the hospital example above, the hospital receptionist does not have access permissions to a patient's EMR. Role identifier 137 did not assign a permitted access role to the patient's EMR. In this scenario, role identifier 137 may generate an electronic "denied access" message to the hospital receptionist denying requested access to the patient's EMR.

Referring now to FIGS. 1, 2A, 2B, and 2C and resuming the description of the functions of identifying a user's role; role identifier 137 of risk access program 134 may identify one or more team members of the user having a permitted role with access to the system within the enterprise network (step 216). With continued reference to the hospital example above, a hospital receptionist may be part of a team of hospital employees that may include a night shift receptionist, and two daytime receptionists. The night shift receptionist may have access to a patient's EMR, and as such, is identified by role identifier 137 as a team member having a similar role as the hospital receptionist without access.

With continued reference to FIGS. 1, 2A, 2B, and 2C, role identifier 137 of risk access program 134 may identify the permitted role shared by a minimum number of the one or more team members (step 218). With continued reference to the hospital example above, role identifier 137 identifies the shared role (i.e. receptionist) between the receptionist without access to a patient's EMR, and the night shift receptionist, the other team member with access to the patient's EMR. Both team members are receptionists, however only one has access to the patient's EMR.

With continued reference to FIGS. 1, 2A, 2B, and 2C, role identifier 137 of risk access program 134 may assign to the user the permitted role shared by the minimum number of the one or more team members (step 220). With continued reference to the illustrative example above, role identifier 137 assigns the identified role of the night shift receptionist, with access to the patient's EMR, to the receptionist without access to the patient's EMR. This role assignment is accomplished without the need for a hospital administrator to manually approve access, or send an e-mail for access permission to another hospital employee.

Referring now to FIGS. 1, 2A, 2B, 2C, and 2D, and resuming the description of the functions of identifying a user's role; role identifier 137 of risk access program 134 may assign, to the user, the permitted role shared by the minimum number of the one or more team members only if the enterprise hierarchy level of the user has a minimum required distance from the enterprise hierarchy level of a root user (step 222). With reference to the hospital example above, the hospital system administrator may additionally configure user-assigned access permissions to a patient's EMR as being no more than two hierarchy levels down, in the hospital hierarchy structure, from the patient's assigned doctor (i.e. root user). For example, even though the hospital receptionist may share a role with a fellow team member (the night shift receptionist), the hospital receptionist may not be assigned user access to the patient's EMR due to the fact that the receptionist is more than two hierarchy levels down from the patient's assigned doctor.

With continued reference to FIGS. 1, 2A, 2B, 2C, and 2D, role identifier 137 of risk access program 134 may assign, to the user, the permitted role shared by the minimum number of the one or more team members only if the enterprise hierarchy level of the user has a minimum required distance from the enterprise hierarchy level of the one or more team members (step 224). With continued reference to the hospital example above, the hospital system administrator may additionally configure the hospital receptionist's user-assigned access permissions to a patient's EMR as requiring the hospital receptionist to being no more than two hierarchy levels removed, in the hospital hierarchy structure, from the night shift receptionist (i.e. fellow team member). For example, even though the hospital receptionist may share a role with a fellow team member (the night shift receptionist), the hospital receptionist may be precluded from receiving a user-assigned role to access a patient's EMR due to the fact that the hospital receptionist is more than two hierarchy levels removed from the night shift receptionist. Perhaps, in this scenario, night shift receptionists have greater responsibilities than a regular hospital receptionist and, as such, are placed higher up in the hospital hierarchy structure.

Referring now to FIGS. 1, 2A, and 2E, and resuming the description of the functions of determining a risk score; risk score engine 138 of risk access program 134 may determine a risk score representing dissemination of data object 122 by assigning one or more weight values to the one or more numerical values associated with the one or more dimensions of data object 122, wherein the one or more weight values may be a numerical value (step 226).

With continued reference to FIGS. 1, 2A, and 2E, risk score engine 138 of risk access program 134 multiplies the one or more weight values with the one or more numerical values associated with the one or more dimensions of data object 122, to create one or more weight-dimension values corresponding to the one or more dimensions of data object 122 (step 228).

With continued reference to FIGS. 1, 2A, and 2E, risk score engine 138 of risk access program 134 aggregates the one or more weight-dimension values to create a risk score for data object 122 (step 230).

Referring now to FIGS. 1, 2A, and 2F, access controller 139 of risk access program 134 determines that the risk score of the data object 122 is less than the pre-configured threshold value of the data object 122 (step 232).

With continued reference to FIGS. 1, 2A, and 2F, access controller 139 of risk access program 134 consults an information governance catalog for the enterprise system, where the information governance catalog details role-based access permissions to the one or more dimensions of the data object 122 (step 234). The information governance catalog may be, for example, data object governance catalog 126.

With continued reference to FIGS. 1, 2A, and 2F, access controller 139 of risk access program 134 filters the one or more dimensions of the data object 122 based on the information governance catalog (step 236). Details of the method step for filtering the one or more dimensions of the data object 122 is discussed below in connection with FIG. 2G.

With continued reference to FIGS. 1, 2A, and 2F, access controller 139 of risk access program 134 allows the user access to the one or more dimensions of data object 122 that are filtered (step 238). By filtering the dimensions of data object 122, access controller 139 provides access to filtered portions of data object 122 to which the user's role and risk score of the filtered dimensions indicate that the user can be granted access.

Referring now to FIGS. 1, 2A, 2F, and 2G, access controller 139 of risk access program 134 maps the one or more dimensions of the data object 122 that are accessible to the role of the user (step 240). Mapping the one or more dimensions refers to a process by which access controller 139 cross references the requesting user's identified role with access policy indicators for various dimensions of the relevant data object 122.

With continued reference to FIGS. 1, 2A, 2F, and 2G, access controller 139 of risk access program 134 denotes, with a "true" value, the one or more dimensions of the data object 122 that are accessible to the role of the user (step 242), based on the mapping (step 240).

With continued reference to FIGS. 1, 2A, 2F, and 2G, access controller 139 of risk access program 134 denotes, with a "false" value, the one or more dimensions of the data object 122 that are not accessible to the role of the user (step 244), based on the mapping (step 240).

With continued reference to FIGS. 1, 2A, 2F, and 2G, access controller 139 of risk access program 134 returns the one or more denoted dimensions comprising a "true" value as those dimensions, of data object 122, that are accessible to the role of the user (step 246), based on the mapping (step 240).

Referring now generally to embodiments of the invention, role-based access control to data objects and their dimensions allows a single policy to be defined for a given dimension across an enterprise based on an accessing user's role in the enterprise, and the risk of inadvertent dissemination of the information. Using this model, a system administrator may regulate security and access policies for information assets across the enterprise by defining them in one place, for example, an information governance catalog. Since granting access to a data object and its dimensions is based on this role-based policy, there is no longer a need for manual granting or revocation of access permissions.

Referring now to FIG. 3, a block diagram is provided, depicting components of a computing device (such as user device 110, enterprise server(s) 120, or data object gateway server 130, as shown in FIG. 1), in accordance with an embodiment of the present invention. It should be appreciated that FIG. 3 provides only an illustration of one implementation and does not imply any limitations with regard to the environments in which different embodiments may be implemented. Many modifications to the depicted environment may be made.

User device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as risk access program 134, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User device 110 may also include a R/W drive or interface 914 to read from and write to one or more portable computer readable storage media 926. Application programs 911 on user device 110 may be stored on one or more of the portable computer readable storage media 926, read via the respective R/W drive or interface 914 and loaded into the respective computer readable storage media 908.

User device 110 may also include a network adapter or interface 916, such as a TCP/IP adapter card or wireless communication adapter (such as a 4G wireless communication adapter using OFDMA technology). Application programs 911 on user device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
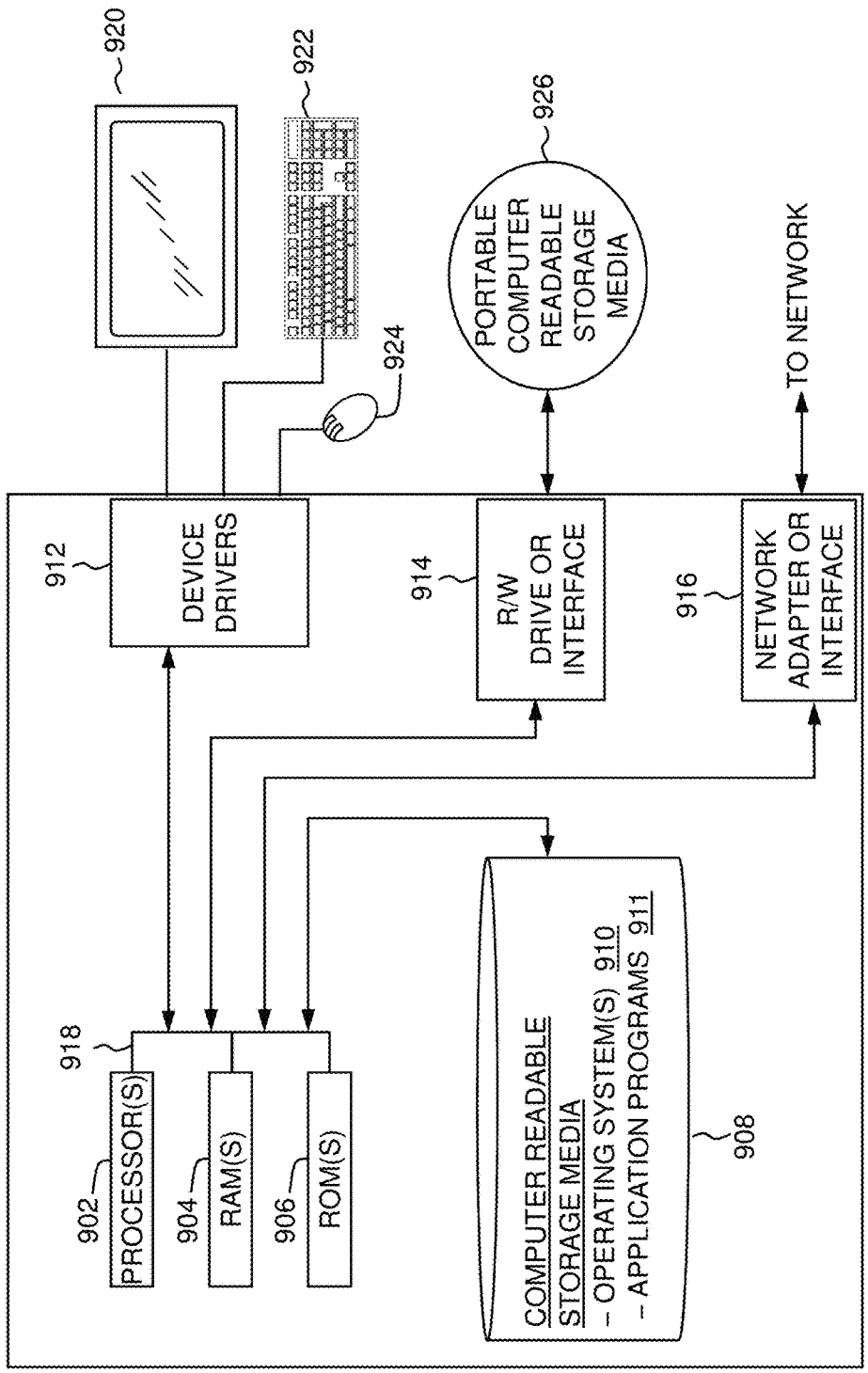
FIG. 4 is a diagram graphically illustrating the hardware components of a computing environment of FIG. 1, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
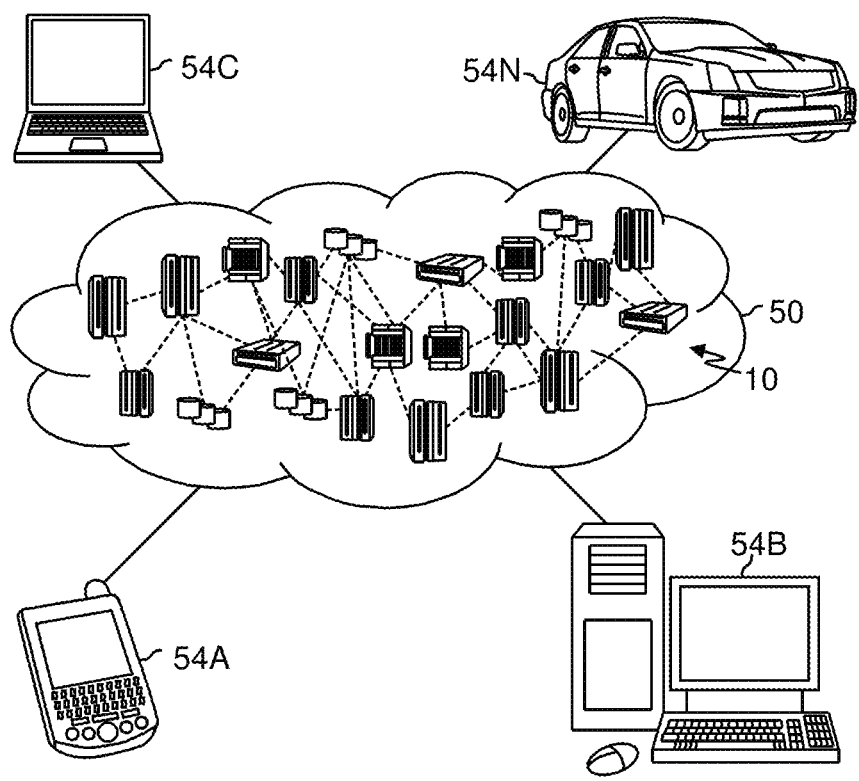
FIG. 5 depicts a cloud computing environment, in accordance with an embodiment of the present invention.
Figure 6:
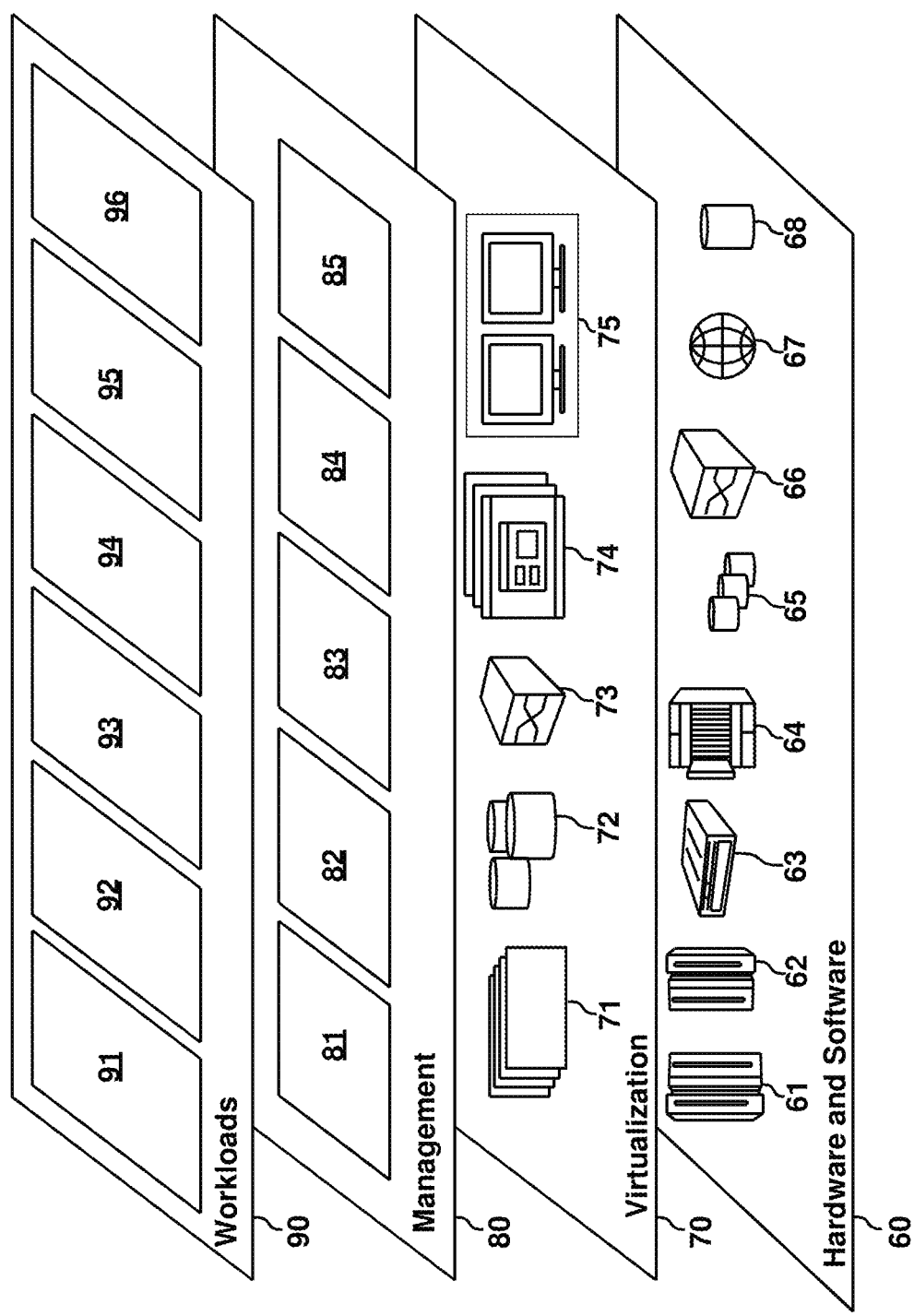
FIG. 6 depicts abstraction model layers of the illustrative cloud computing environment of FIG. 5, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A method of controlling access to one or more portions of a data object stored on a tangible device of a computer system comprising:
   receiving, by a computer, a user request to access one or more portions of a data object;
   identifying, by the computer, a role of the user;
   determining, by the computer, that the role of the user is not permitted access to the one or more portions of the data object;
   identifying, by the computer, one or more team members of the user having a permitted access role to the one or more portions of the data object;
   comparing, by the computer, the role of the user with the identified one or more team members of the user having the permitted access role to the one or more portions of the data object;
   based on the comparison, determining by the computer, that the identified role of the user is shared by a minimum number of the identified one or more team members of the user having the permitted access role to the one or more portions of the data object;
   assigning, dynamically by the computer, the permitted access role to the user only if an enterprise hierarchy level of the user has a minimum required distance from a root use and has a minimum required distance from the enterprise hierarchy level for the one or more team members;
   determining, by the computer, a risk score representing a risk of disseminating the one or more portions of the data object, wherein the risk score is based in part on one or more dimensions of the one or more portions of the data object and aggregating one or more weight-dimension values corresponding to one or more dimensions of the data object to create an aggregated risk score for the data object;
   responsive to determining the aggregated risk score of the data object is less than a pre-configured threshold value, consulting an information governance catalog for the computer, wherein the information governance catalog details access permissions represented by a matrix that maps a list of the one or more dimensions of the data object into a list of different user's roles; and
   allowing the user access to the one or more dimensions of the data object that are filtered and indicated as the one or more dimensions of the data object are accessible to the requesting user having the identified and assigned role.

2. The method of claim 1, wherein identifying a role of the user comprises either one or more of the following:
   verifying, by the computer, that the user is assigned the permitted access role to the one or more portions of the data object on a computer system containing the data object;
   assigning, by the computer, the permitted access role for the user that permits access to the computer system containing the one or more portions of the data object based on how the user compares to other users in an enterprise hierarchy; or
   denying, by the computer, access to the one or more portions of the data object.

3. The method of claim 2, wherein assigning the permitted access role to the user comprises:
   assigning the permitted access role to the user, if an enterprise hierarchy level of the user has a minimum required distance from the enterprise hierarchy level for a root user.

4. The method of claim 2, wherein assigning the permitted access role to the user comprises:
   assigning the permitted access role to the user, if an enterprise hierarchy level of the user has a minimum required distance from the enterprise hierarchy level for the identified one or more team members.

5. The method of claim 1, wherein the one or more dimensions of the data object comprise:
   one or more specific characteristics, elements, or properties of the data object.

6. The method of claim 1, wherein determining a risk score representing a risk of disseminating the one or more portions of the data object, further comprises:
   assigning one or more weight values to one or more numerical values associated with the one or more dimensions of the data object, wherein the one or more weight values may be a numerical value;
   multiplying the one or more weight values with the one or more numerical values associated with the one or more dimensions of the data object, to create one or more weight-dimension values corresponding to the one or more dimensions; and
   aggregating the one or more weight-dimension values to create a risk score for the data object.

7. The method of claim 1, wherein controlling access to the one or more portions of the data object further comprises:
   determining that the risk score of the one or more portions of the data object is less than a pre-configured threshold value of the data object;
   consulting an information governance catalog for the computer system, wherein the information governance catalog details access permissions to the one or more dimensions of the one or more portions of the data object;
   filtering the one or more dimensions of the one or more portions of the data object based on the information governance catalog; and
   allowing the user access to the one or more dimensions of the one or more portions of the data object that are filtered.

8. The method of claim 7, wherein filtering the one or more dimensions comprises:
   mapping the one or more dimensions of the one or more portions of the data object that are accessible to the role of the user, based on the information governance catalog;
   denoting, with a "true" value, the one or more dimensions of the one or more portions of the data object that are accessible to the role of the user;
   denoting, with a "false" value, the one or more dimensions of the one or more portions of the data object that are not accessible to the role of the user; and
   returning the one or more denoted dimensions comprising a "true" value as those dimensions that are accessible to the role of the user.

9. The method of claim 1, wherein controlling access to the one or more portions of the data object further comprises:

determining that the risk score of the one or more portions of the data object is equal to or greater than a pre-configured threshold value of the one or more portions of the data object; and denying the user access to the one or more portions of the data object.

10. A computer program product for performing electronic natural language processing on unstructured data, embodied in a non-transitory tangible storage device having program code embodied therewith, the program code executable by a hardware processor of a computer to perform a method, the method comprising:

receiving, by the hardware processor, a user request to access one or more portions of a data object;

identifying, by the hardware processor, a role of the user;

determining, by the hardware processor, that the role of the user is not permitted access to the one or more portions of the data object;

identifying, by the hardware processor, one or more team members of the user having a permitted access role to the one or more portions of the data object;

comparing, by the hardware processor, the role of the user with the identified one or more team members of the user having the permitted access role to the one or more portions of the data object;

based on the comparison, determining, by the hardware processor, that the identified role of the user is shared by a minimum number of the identified one or more team members of the user having the permitted access role to the one or more portions of the data object;

assigning, dynamically by the hardware processor, the permitted access role to the user only if an enterprise hierarchy level of the user has a minimum required distance from a root user and has a minimum required distance from the enterprise hierarchy level for the one or more team members;

determining, by the hardware processor, a risk score representing a risk of disseminating the one or more portions of the data object, wherein the risk score is based in part on one or more dimensions of the one or more portions of the data object and aggregating one or more weight-dimension values corresponding to one or more dimensions of the data object to create an aggregated risk score for the data object;

responsive to determining the aggregated risk score of the data object is less than a pre-configured threshold value, consulting an information governance catalog for the computer, wherein the information governance catalog details access permissions represented by a matrix that maps a list of the one or more dimensions of the data object into a list of different user's roles; and allowing the user access to the one or more dimensions of the data object that are filtered and indicated as the one or more dimensions of the data object are accessible to the requesting user having the identified and assigned role.

11. The computer program product of claim 10, wherein the method further comprises:

verifying, by the hardware processor, that the user is assigned the permitted access role to the one or more portions of the data object on a computer system containing the data object;

assigning, by the hardware processor, the permitted access role for the user that permits access to the computer system containing the one or more portions of the data object based on how the user compares to other users in an enterprise hierarchy; or denying, by the hardware processor, access to the one or more portions of the data object.

12. The computer program product of claim 10, wherein determining a risk score representing a risk of disseminating the one or more portions of the data object, further comprises:

assigning, by the hardware processor, one or more weight values to one or more numerical values associated with the one or more dimensions of the data object, wherein the one or more weight values may be a numerical value;

multiplying, by the hardware processor, the one or more weight values with the one or more numerical values associated with the one or more dimensions of the data object, to create one or more weight-dimension values corresponding to the one or more dimensions; and aggregating, by the hardware processor, the one or more weight-dimension values to create a risk score for the data object.

13. The computer program product of claim 10, wherein controlling access to the one or more portions of the data object further comprises:

determining, by the hardware processor, that the risk score of the one or more portions of the data object is less than a pre-configured threshold value of the data object;

consulting, by the hardware processor, an information governance catalog for the computer system, wherein the information governance catalog details access permissions to the one or more dimensions of the one or more portions of the data object;

filtering, by the hardware processor, the one or more dimensions of the one or more portions of the data object based on the information governance catalog; and allowing, by the hardware processor, the user access to the one or more dimensions of the one or more portions of the data object that are filtered.

14. The computer program product of claim 10, wherein filtering the one or more dimensions comprises:

mapping, by the hardware processor, the one or more dimensions of the one or more portions of the data object that are accessible to the role of the user, based on the information governance catalog;

denoting, by the hardware processor, with a "true" value, the one or more dimensions of the one or more portions of the data object that are accessible to the role of the user;

denoting, by the hardware processor, with a "false" value, the one or more dimensions of the one or more portions of the data object that are not accessible to the role of the user; and returning, by the hardware processor, the one or more denoted dimensions comprising a "true" value as those attributes that are accessible to the role of the user.

15. A computer system for performing electronic natural language processing functions on unstructured data, comprising:

one or more computer devices each having one or more hardware processors and one or more non-transitory tangible storage devices; and a program embodied on at least one of the one or more storage devices, the program having a plurality of program instructions for execution by the one or more hardware processors to perform the functions of:

receiving, by a computer, a user request to access one or more portions of a data object;

identifying, by the computer, a role of the user;

determining, by the computer, that the role of the user is not permitted access to the one or more portions of the data object;

identifying, by the computer, one or more team members of the user having a permitted access role to the one or more portions of the data object;

comparing, by the computer, the role of the user with the identified one or more team members of the user having the permitted access role to the one or more portions of the data object;

based on the comparison, determining by the computer, that the identified role of the user is shared by a minimum number of the identified one or more team members of the user having the permitted access role to the one or more portions of the data object;

assigning, dynamically by the computer, the permitted access role to the user only if an enterprise hierarchy level of the user has a minimum required distance from a root user and has a minimum required distance from the enterprise hierarchy level for the one or more team members;

determining, by the computer, a risk score representing a risk of disseminating the one or more portions of the data object, wherein the risk score is based in part on one or more dimensions of the one or more portions of the data object and aggregating one or more weight-dimension values corresponding to one or more dimensions of the data object to create an aggregated risk score for the data object;

responsive to determining the aggregated risk score of the data object is less than a pre-configured threshold value, consulting an information governance catalog for the computer, wherein the information governance catalog details access permissions represented by a matrix that maps a list of the one or more dimensions of the data object into a list of different user's roles; and allowing the user access to the one or more dimensions of the data object that are filtered and indicated as the one or more dimensions of the data object are accessible to the requesting user having the identified and assigned role.

16. The computer system of claim 15, wherein the program instructions further comprise instructions for:

verifying, by the computer, that the user is assigned the permitted access role to the one or more portions of the data object on a computer system containing the data object;

assigning, by the computer, the permitted access role for the user that permits access to the computer system containing the one or more portions of the data object based on how the user compares to other users in an enterprise hierarchy; or denying, by the computer, access to the one or more portions of the data object.

17. The computer system of claim 15, wherein the program instructions for determining a risk score representing a risk of disseminating the one or more portions of the data object further comprise instructions for:

assigning, by the computer, one or more weight values to one or more numerical values associated with the one or more dimensions of the data object, wherein the one or more weight values may be a numerical value;

multiplying, by the computer, the one or more weight values with the one or more numerical values associated with the one or more dimensions of the data object, to create one or more weight-dimension values corresponding to the one or more dimensions; and aggregating, by the computer, the one or more weight-dimension values to create a risk score for the data object.

18. The computer system of claim 15, wherein the program instructions for controlling access to the one or more portions of the data object comprise instructions for:

determining, by the computer, that the risk score of the one or more portions of the data object is less than a pre-configured threshold value of the data object;

consulting, by the computer, an information governance catalog for the computer system, wherein the information governance catalog details access permissions to the one or more dimensions of the one or more portions of the data object;

filtering, by the computer, the one or more dimensions of the one or more portions of the data object based on the information governance catalog; and allowing, by the computer, the user access to the one or more dimensions of the one or more portions of the data object that are filtered.

19. The computer system of claim 15, wherein the program instructions for filtering the one or more dimensions comprise instructions for:

mapping, by the computer, the one or more dimensions of the one or more portions of the data object that are accessible to the role of the user, based on the information governance catalog;

denoting, by the computer, with a "true" value, the one or more dimensions of the one or more portions of the data object that are accessible to the role of the user;

denoting, by the computer, with a "false" value, the one or more dimensions of the one or more portions of the data object that are not accessible to the role of the user; and returning, by the computer, the one or more denoted dimensions comprising a "true" value as those attributes that are accessible to the role of the user.

* * * * *